United States Patent
Itoh et al.

[11] Patent Number: 5,774,124
[45] Date of Patent: Jun. 30, 1998

[54] FINITE ELEMENT MODELING METHOD AND COMPUTER SYSTEM FOR CONVERTING A TRIANGULAR MESH SURFACE TO A QUADRILATERAL MESH SURFACE

[75] Inventors: Takayuki Itoh, Sagamihara; Kenji Shimada, Yokohama, both of Japan

[73] Assignee: International Business Machines Corporation, Armonk, N.Y.

[21] Appl. No.: 549,361

[22] Filed: Oct. 27, 1995

[30] Foreign Application Priority Data

Nov. 7, 1994 [JP] Japan ................................ 6-271966

[51] Int. Cl.$^6$ .................................................. G06T 17/00
[52] U.S. Cl. ............................................................ 345/423
[58] Field of Search ................................ 395/123, 119, 395/120, 133; 364/570, 474.22, 474.23, 474.24

[56] References Cited

U.S. PATENT DOCUMENTS

| | | | |
|---|---|---|---|
| 3,889,107 | 6/1975 | Sutherland | 395/125 |
| 4,534,813 | 8/1985 | Williamson et al. | 156/212 |
| 4,646,251 | 2/1987 | Hayes et al. | 395/123 |
| 4,785,399 | 11/1988 | Evans et al. | 395/352 |
| 4,912,644 | 3/1990 | Aoyama et al. | 364/468.04 |
| 4,930,092 | 5/1990 | Reilly | 395/123 |
| 4,933,889 | 6/1990 | Meshkat et al. | 364/578 |
| 5,020,002 | 5/1991 | Malachowsky | 395/143 |
| 5,125,038 | 6/1992 | Mashkat et al. | 382/22 |
| 5,128,872 | 7/1992 | Malachowsky et al. | 395/513 |
| 5,315,537 | 5/1994 | Blacker | 364/570 |
| 5,553,206 | 9/1996 | Meshkat | 395/123 |
| 5,602,979 | 2/1997 | Loop | 395/123 |

FOREIGN PATENT DOCUMENTS

| | | |
|---|---|---|
| 7-230487 | 8/1995 | Japan . |
| 2 227 146 | 7/1990 | United Kingdom . |

OTHER PUBLICATIONS

IBM TDB vol. 14, No. 7, Dec. 1971, "Program for the Interactive Design of Polyhedra", A. Appel et al.
"Provably Good Mesh Generation" by Marshall Bern et al, pp. 384–409 1994.
"Domain Delaunay Tetrahedrization of Arbitrarily Shaped Curved Polyhedra Defined in a Solid Modeling System" by Sapidis et al. pp. 465–480 1991.
"Finite Element Mesh Generation Methods: A Review and Classification" pp. 27–38 1988.

*Primary Examiner*—Almis R. Jankus
*Attorney, Agent, or Firm*—Leslie G. Murray; James C. Pintner

[57] ABSTRACT

A method and computer system for converting triangular meshes to quadrilateral meshes in a computer system. The computer system comprises a processor and a means for inputting graphical data. The graphical data comprises a surface, the surface is defined by a boundary and comprises a triangular mesh. The method comprises the processor-executed steps of: (a) ascertaining the topological distance of the triangles on the triangular mesh to the boundary; (b) dividing the surface into layers of triangles, such that each layer comprises triangles within a range of topological distances; (c) within each layer, forming groups of triangles; and (d) dividing each group into at least three quadrilateral elements.

18 Claims, 12 Drawing Sheets

FINITE ELEMENT MODELING METHOD AND COMPUTER SYSTEM FOR CONVERTING A TRIANGULAR MESH SURFACE TO A QUADRILATERAL MESH SURFACE

RELATED APPLICATION

This application relates to commonly-assigned, U.S. application Ser. No. 08/017,074, filed Feb. 12, 1993 now U.S. Pat. No. 5,553,206.

BACKGROUND OF THE INVENTION

The present invention relates generally to the field of computer modeling and computer graphics. In particular, the invention relates to a method and system for automatically generating quadrilateral meshes in a computer system.

Mesh division is a method for dividing a two-dimensional region into simpler polygons, such as triangles or quadrilaterals. Many applications, such as finite-element analysis, computer graphics, and computer aided design (CAD), use mesh division.

Triangular mesh computation techniques are well-known to those skilled in the art. Japanese Unexamined Patent Publication No. Hei 1-286081 (U.S. Pat. No. 4,933,889) describes method of a triangular mesh division using a rough analysis of a Voronoi region. The present applicant in Japanese Unexamined Patent Publication No. Hei 6-19226 discloses a triangular mesh dividing technique in resolving a dynamic equation for bubble motion.

However, more applications require quadrilateral meshes than triangular meshes. It is well known that, for the same number of elements, an analysis using quadrilateral meshes is more accurate than an analysis using triangular meshes. When quadrilateral meshes having a degree of freedom of deformation in one element are used, a correct solution is obtained with only a few elements, especially for elasto-plastic deformation analysis, such as in analyzing automobile collision and simulating plate formation, for example. Because such analysis usually requires a large number of elements, quadrilateral meshes reduce the computation time.

In fluid analysis, quadrilateral meshes that are substantially aligned along the boundary condition for a flow are preferred. In addition, quadrilateral meshes improve the accuracy and convergence of a solution.

In computer graphics, quadrilateral domains are better than triangular domains for interpolating the internal region of a complex mathematical function that uses colors at vertices and luminance values. In addition to being used for curve insertion in CAD, interpolation is often represented as the mapping of a rectangular parameter region to real space.

In texture mapping, when a parameter space in a given trimmed surface is divided into elements and textures are patched for the individual elements, a quadrilateral shape is preferred because the ordinary texture is defined as quadrilateral region.

In a typical CAD system, a surface is represented as a rectangular domain for which mapping is performed from a parameter space to a real space. A surface which is enclosed by a boundary having a complex shape is represented by limiting the region to be mapped by a trim curve, and such a surface is called a trimmed surface. When the computation for a set of a three-dimensional shaped regions which are enclosed by trimmed surfaces is repeated, the trim curves are complex and the processing efficiency for shapes deteriorates. Therefore the trimmed surface is divided into several simple rectangular elements, and the surface is repatched with the individual elements.

To employ quadrilateral meshes for the above described techniques, the following requirements should be satisfied.

Figure 1A:
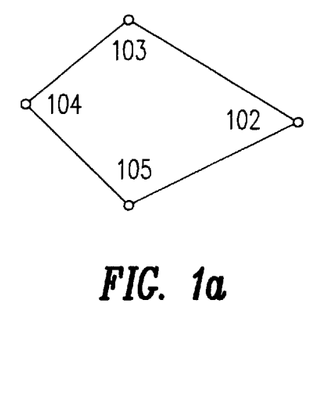
FIGS. 1a and 1b are diagrams showing a convex and a concave quadrilateral.
Figure 1B:
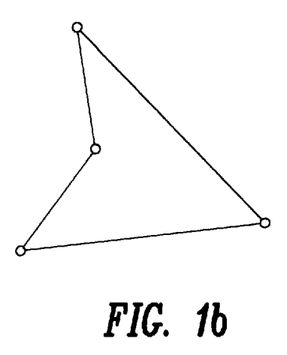

Requirement 1: An output quadrilateral is convex. This requirement is important because finite-element analysis uses convex quadrilateral elements. A quadrilateral is convex if all the interior angles are less than or equal to 180°. Referring to FIG. 1a, a diagram of a desirable convex quadrilateral is shown. Even though interior angles are less than 180°, it is desirable that interior angles not be too close to 180°. In addition, a concave quadrilateral is not appropriate for computer graphics when the internal color and the luminance value of the quadrilateral element is to be interpolated by using a value on a boundary. Referring to FIG. 1b, a diagram of a concave quadrilateral is shown.

Figure 2A:
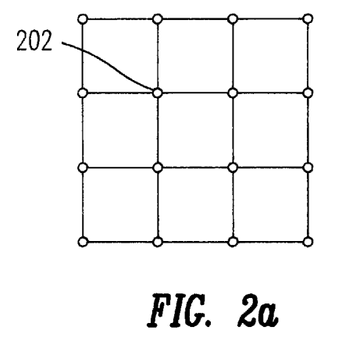
Figure 2B:
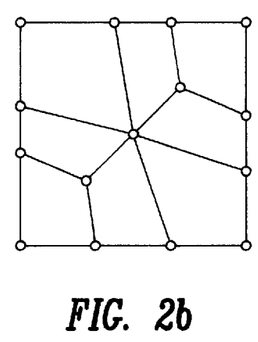

Requirement 2: The generated quadrilateral meshes closely resemble tetragonal lattices. Tetragonal lattices are topologically the most regular quadrilateral meshes. Referring to FIG. 2a, a desirable topologically regular quadrilateral mesh is shown. It is desirable that four quadrilaterals meet at a single vertex inside a region. When there are many such vertices, the meshes are more regular topologically. Smoothing is a process which shifts surrounding vertices toward the barycenter. When smoothing is performed as a post-process on topologically regular meshes, the element shapes improve. When smoothing is performed on irregular meshes, the element shapes do not greatly improve. Referring to FIG. 2b, an undesirable mesh with an irregular topology is shown.

Figure 3A:
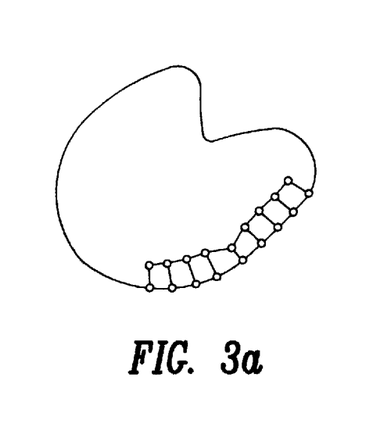
Figure 3B:
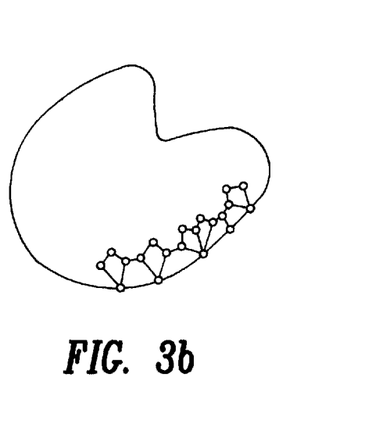

Requirement 3: The sides of the quadrilateral elements are substantially aligned along the region boundary. Referring to FIG. 3a, a desirable mesh aligned along the boundary is shown. In an analysis, especially fluid analysis, the result often changes significantly in a direction perpendicular to the boundary. Therefore, it is preferable that the sides of the elements be substantially aligned along the boundary to increase solution accuracy. Referring to FIG. 3b, an undesirable mesh not aligned along the boundary is shown.

Requirement 4: The distribution of the sizes of the elements for triangular meshes are substantially maintained. The size of the meshes determines the accuracy of a result obtained from an analysis and the accuracy of the approximated shape in computer graphics. Therefore, it is preferred that the size distribution of the triangles be substantially maintained after converting the triangles into quadrilateral meshes.

Requirement 5: The amount of computation is practical.

A method for converting triangular meshes into quadrilateral meshes by converting one triangle into three quadrilaterals is well-known in the art. The processing is performed mechanically and the computation time is small. However, mesh irregularity is increased over the entire region and quadrilateral meshes can not be generated along a boundary. In other words, requirements 2 and 3 are not satisfied.

Another well-known method converts pairs of adjacent triangles into four quadrilaterals. Using graph theory, maximal matching is performed on a graph to form triangle pairs of adjacent triangles. The method converts a matched triangle pair into four quadrilaterals. For isolated triangles, the method converts one triangle into three quadrilaterals. This method seems satisfactory because maximal matching is a well-known algorithm from graph theory and maximizes the number of matches of adjacent triangle pairs. However, there are many problems. For n triangles, the amount of computation is $O(n^3)$, which is not a practical computation time for large meshes. In addition, since topological irregularity is not always reduced by maximizing the number of matchings, the quality of meshes is not improved when though the amount of computation is large. Furthermore, requirement 3 is not met because irregular meshes tend to be generated near the boundary. Therefore, this method is not appropriate for a simulation model.

As described above, a method for the conversion of triangular meshes that satisfies requirements 1 through 5 is not known.

SUMMARY OF THE INVENTION

It is therefore an object of the present invention to provide a method and system for automatically generating quadrilateral meshes in which the quadrilateral elements of the mesh are convex.

It is another object of the present invention to provide a method and system for automatically generating quadrilateral meshes in which the sides of quadrilateral elements substantially tetragonal lattices.

It is a further object of the present invention to provide a method an system for automatically generating quadrilateral meshes in which the quadrilateral elements are substantially aligned along a boundary.

It is yet another object of the present invention to provide a method and system for automatically generating quadrilateral meshes in which the distribution of the sizes of the elements of the triangular meshes is substantially maintained.

It is another object of the present invention to reduce the computation time for mesh conversion.

In view of the foregoing objects, the present invention provides a method and system wherein a computer system converts triangular meshes to quadrilateral meshes for a two-dimensional surface. The computer system has a means for inputting graphical data and the graphical data comprises at least one surface having a boundary. A triangular mesh divides the surface into triangles. To convert the triangles into quadrilateral elements, the computer system ascertains the topological distance of the triangles from the boundary. Based on the topological distance, the surface is divided into layers. The layers are comprised of triangles within a predefined range topological distance from the boundary. Triangles within each layer are grouped. Each group of triangles is combined and divided into at least three quadrilateral elements.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which:

FIGS. 2a and 2b are diagrams showing topologically regular and irregular quadrilateral meshes;

FIGS. 3a and 3b are diagrams showing quadrilateral meshes aligned and not aligned along a boundary;

DETAILED DESCRIPTION OF THE PREFERRED EMBODIMENTS

The following description is the preferred embodiment presently contemplated for carrying out the present invention. This description and the alternative embodiments shown are made for the purpose of illustrating the general principle of the present invention and are not meant to limit the inventive concepts claimed herein.

Mesh Topology

Referring to FIG. 1a, a convex quadrilateral element is shown. In the preferred embodiment, a quadrilateral element is convex. A convex quadrilateral has the property that all the interior angles 102, 103, 104, 105 are 180° or smaller. In the preferred embodiment, the interior angles 102, 103, 104, 105 of the quadrilateral element are not too close to 180°. In FIG. 1b, a concave quadrilateral element is shown.

Referring to FIG. 2a, a desirable topologically regular quadrilateral mesh is shown. In the preferred embodiment, the generated quadrilateral meshes are substantially tetragonal lattices that are topologically the most regular quadrilateral meshes. In the preferred embodiment, four quadrilaterals are assembled at a single vertex 202 inside the region. When there are many such vertices, the meshes are more regular topologically. In FIG. 2b, an undesirable topologically irregular quadrilateral mesh is shown.

Referring to FIGS. 3a and 3b, quadrilateral meshes along a boundary are shown. In the preferred embodiment, as shown in FIG. 3a, the sides of the quadrilateral elements are substantially aligned along the region boundary. In FIG. 3b, an undesirable quadrilateral mesh not aligned along a boundary is shown.

Conversion Methods

In the preferred embodiment of the present invention, three methods are used to convert triangular meshes into quadrilateral meshes.

Figure 4:
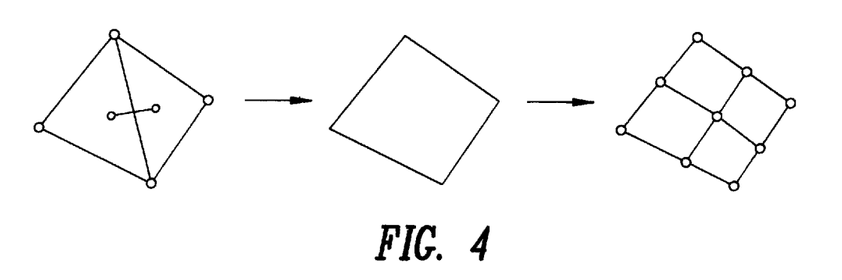
FIG. 4 is a diagram showing conversion method 1, a method for converting two triangles into four quadrilaterals.

Conversion method 1: Referring to FIG. 4, a method of converting two adjacent triangles into four quadrilaterals is shown.

Figure 5:
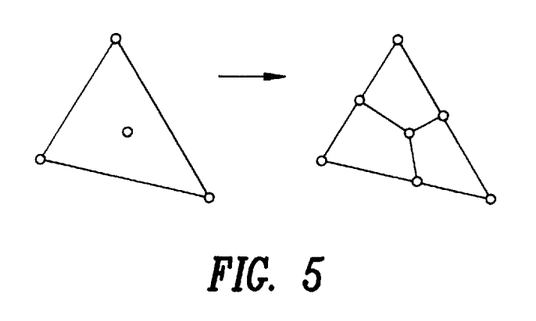
FIG. 5 is a diagram showing conversion method 2, a method for converting one triangle into three quadrilaterals.

Conversion method 2: Referring to FIG. 5, a method of converting one triangle into three quadrilaterals is shown.

Figure 6:
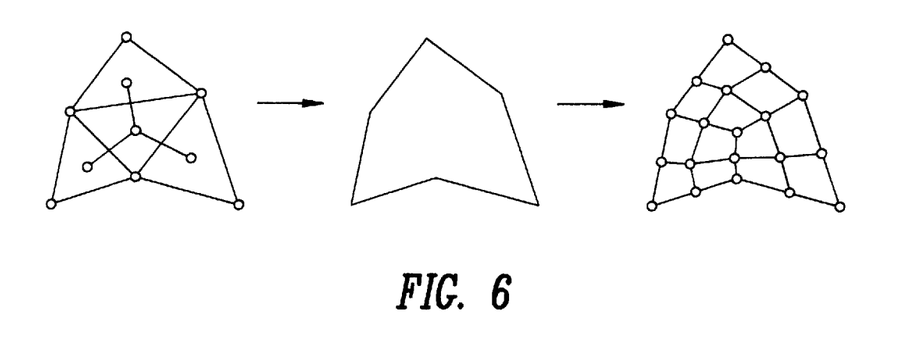
FIG. 6 is a diagram showing conversion method 3, a method for converting four triangles into twelve quadrilaterals.

Conversion method 3: Referring to FIG. 6, a method of converting four triangles, linked in a star shape, into twelve quadrilaterals is shown.

Figure 7A:
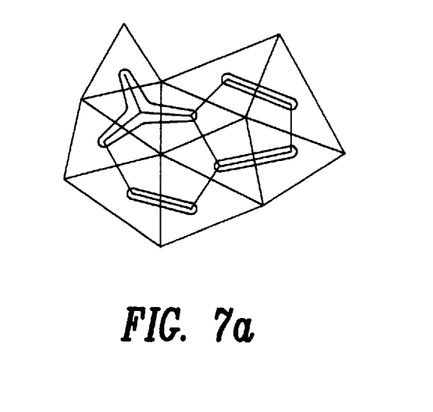
FIGS. 7a, 7b, 7c, 7d, 7e, and 7f are examples of converting triangular meshes into quadrilateral meshes.
Figure 7B:
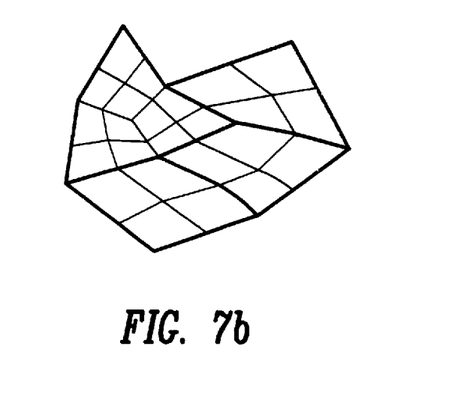
Figure 7C:
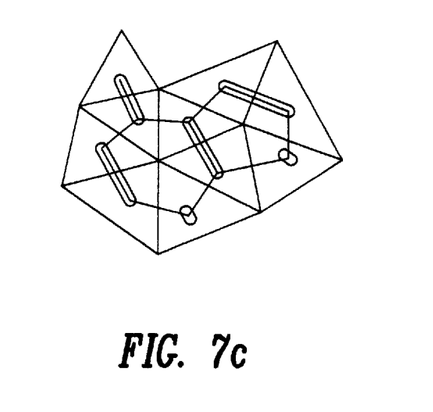
Figure 7D:
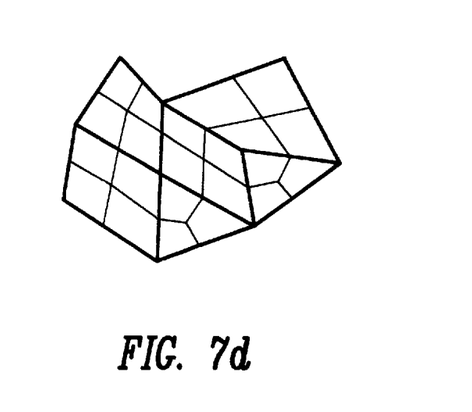
Figure 7E:
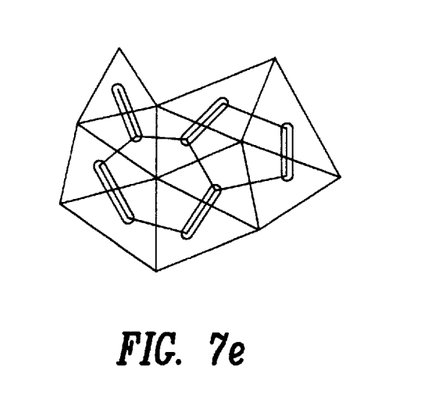
Figure 7F:
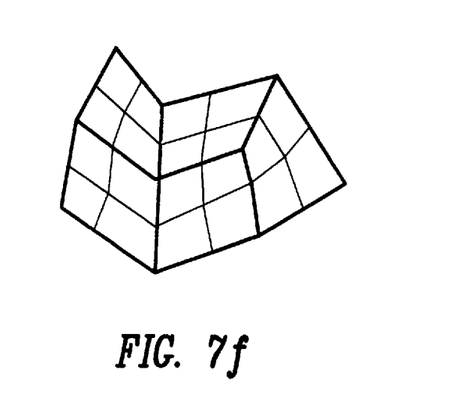

Referring to FIGS. 7a, 7b, 7c, 7d, 7e, and 7f, the three conversion methods are shown in combination. The conversion methods can be combined in several ways. Referring to FIGS. 7a and 7b, a first conversion example is shown. FIG. 7a shows a triangular mesh using conversion methods 1 and 3. Triangles being converted by conversion method 1 are represented by an edge connecting the triangles with an ellipse surrounding the edge. Triangles being converted using conversion method 4 are represented by three edges connection the triangles and a line surrounds the three edges. In FIG. 7b, the quadrilateral mesh corresponding to FIG. 7a is shown. Referring now to FIGS. 7c and 7d, a second conversion example is shown. The second conversion example combines conversion methods 1 and 2. In FIG. 7c, triangles being converted using conversion method 1 are represented by a circle surrounding an interior point of the triangle. In FIG. 7d, the quadrilateral mesh corresponding to FIG. 7c is shown. Referring now to FIGS. 7e and 7f, a third conversion example is shown. In FIG. 7e, the third conversion example uses only conversion method 1 to match adjacent triangles and form triangle pairs. In FIG. 7f, the quadrilateral mesh corresponding to FIG. 7e is shown. In the preferred embodiment, use of conversion method 1 is maximized because it produces the most topologically regular vertices. Conversion methods 2 and 3 generate topologically irregular internal vertices. However, even when using conversion method 1 the same number of times, caution is required because the number of topologically irregular vertices varies depending on the combinations.

Hardware Arrangement

Figure 8:
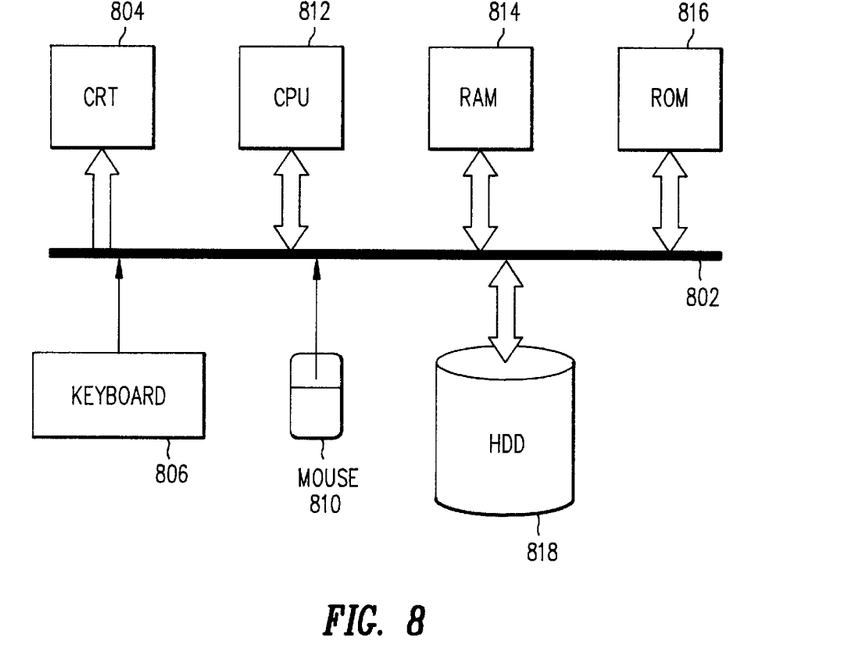
FIG. 8 is a block diagram illustrating a hardware arrangement.

Referring to FIG. 8, a block diagram illustrating a hardware arrangement according the preferred embodiment of the present invention is shown. In FIG. 8, a cathode ray tube (CRT) 804, a keyboard 806, a mouse 810, a central processing unit or processor (CPU) 812, a random access memory (RAM) 814, a read only memory (ROM) 816, and a hard disk drive (HDD) 816 connect to a bus 802. The CRT 804 comprises a display screen, preferably bit mapped, for displaying the system processing results. An operator uses the keyboard 806 to enter commands into the system. The operator uses the mouse 810 to point to an arbitrary location on a display screen. Information concerning the position, that the mouse points to, is input to the system. The CPU 812 performs computation and input/output control. The RAM 814 provides a main storage area for loading an operating system and an application program. The ROM 816 maintains basic input/output routines. The HDD 818 stores the operating system and various application programs, such as a processing program related to the present invention, for example.

Logical Arrangement

Figure 9:
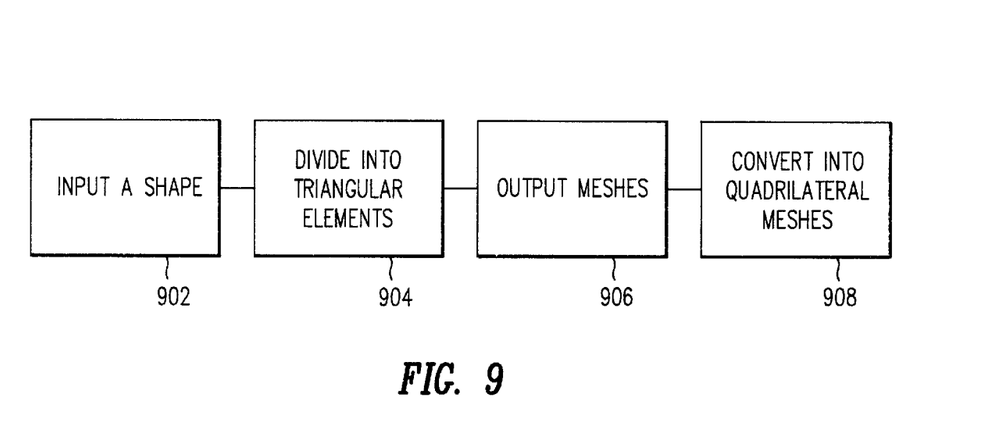
FIG. 9 is a block diagram illustrating a logical arrangement.

Referring to FIG. 9, a block diagram illustrating the logical arrangement according to the preferred embodiment of the present invention is shown. In the preferred embodiment, the individual components 902, 904, 906, 908 are implemented as executable program modules, C language functions, or other module as is well-known in the art, for example. The executable program modules, C language functions, or other modules are stored on the HDD 818 (shown in FIG. 8).

In FIG. 9, a shape input block 902 defines an input shape for mesh division and provides information for element division. The shape input block 902 comprises a means for defining an input shape for mesh division; a means for acquiring topological elements, such as the vertices, edges, faces, and space that constitute the shape; and a means for acquiring geometric information, such as the position and shape of the topological elements.

A triangular element division block 904 receives topological and geometric information from the shape input block 902, arranges mesh nodes, and generates triangular mesh elements.

In the preferred embodiment, the triangular element division block 904 uses the method disclosed in Japanese Unexamined Patent Publication No. Hei 6-19226, hereby incorporated by reference, filed by the present applicant, to generate the triangular mesh elements. Using the information from the shape input block 902, the method of No. Hei 6-19226 arranges the vertices and edges of an input shape, arranges the nodes on a surface, and produces triangles from the arranged nodes by Delaunay's method. However, the present invention is not limited a specific method of triangular mesh generation. The present invention works with many methods for generating triangular meshes.

Using the triangular mesh generated by the triangular element division block 904, a mesh output block 906 extracts geometric information, such as the node coordinates, and topological information, such as node connections. The mesh output block 906 then outputs the extracted information to a quadrilateral mesh conversion block 908. The quadrilateral mesh conversion block 908 generates quadrilateral meshes according to present invention.

Quadrilateral mesh conversion method

Figure 10:
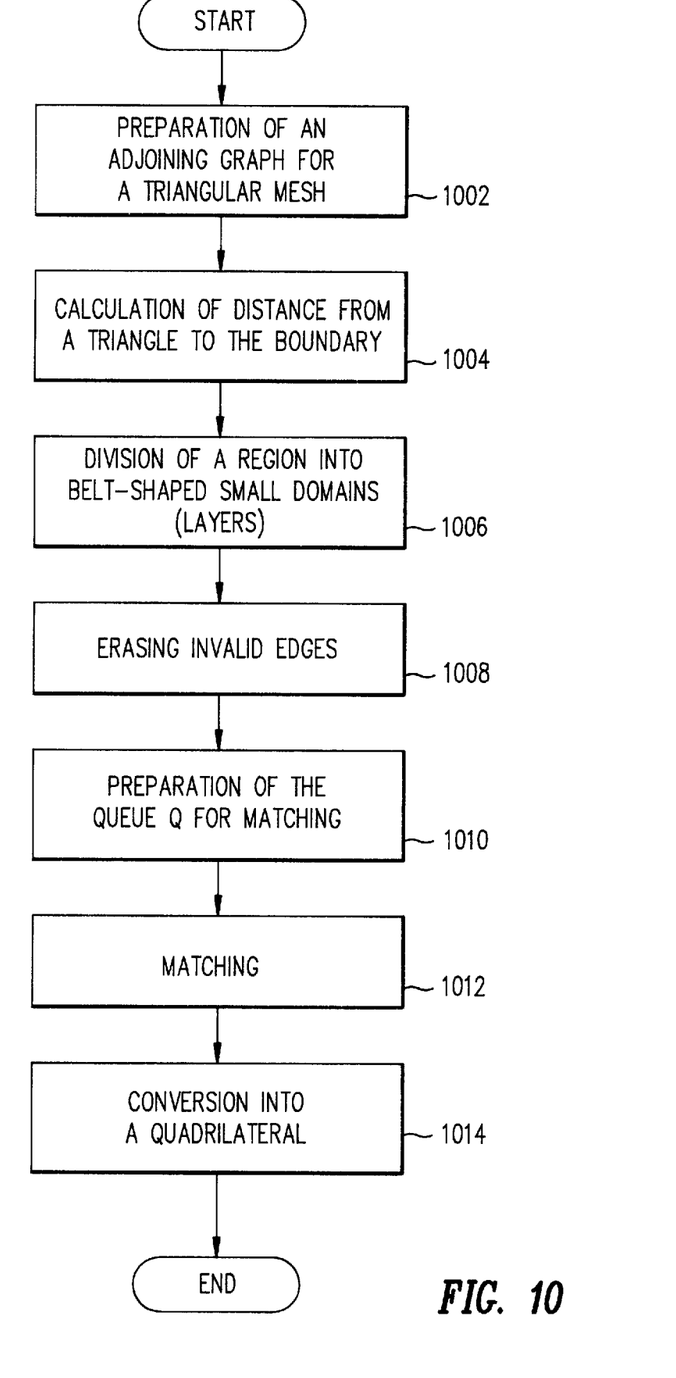
FIG. 10 is a flowchart showing the processing of the present invention.

FIG. 10 is a flowchart showing the major steps of the quadrilateral mesh conversion process according to the preferred embodiment of the present invention is shown. The procedure of FIG. 10 will be described below while also referring to the diagrams in FIGS. 11, 12, and 13.

Generation of an Adjoining Graph of Triangular Meshes

Figure 11:
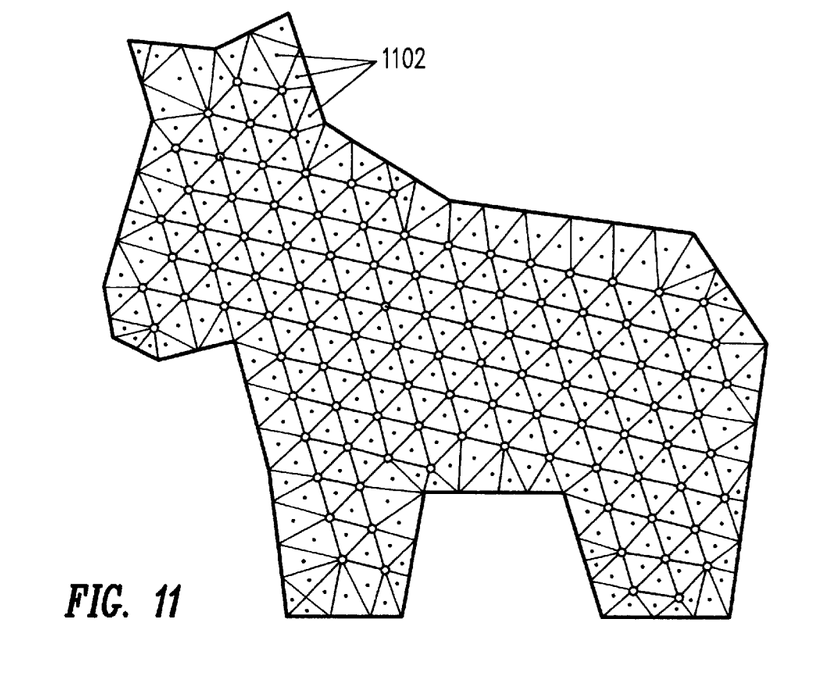
FIG. 11 is an example of a triangular mesh.

In FIG. 10 at step 1002, an adjoining graph $G_t(V_t, E_t)$ is prepared. FIG. 11 shows a surface divided by the triangular element division block 904 (shown in FIG. 9). In FIG. 11, the triangular mesh and center points 1102 for each mesh triangle are shown. At a minimum, one triangle is adjacent one other triangle. At a maximum, one triangle is adjacent three other triangles.

Figure 12:
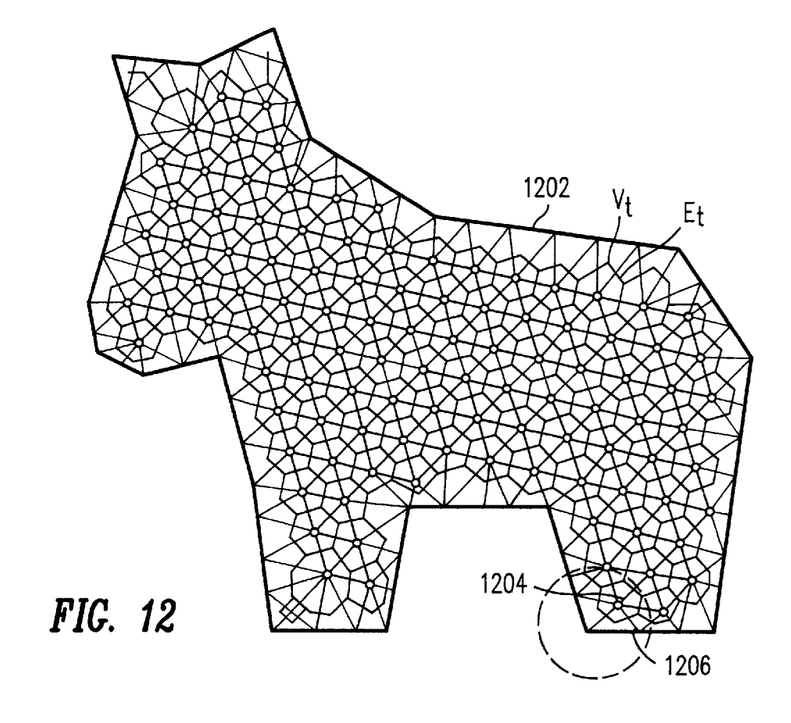
FIG. 12 is a diagram showing an adjoining graph in a triangular mesh.
Figure 13:
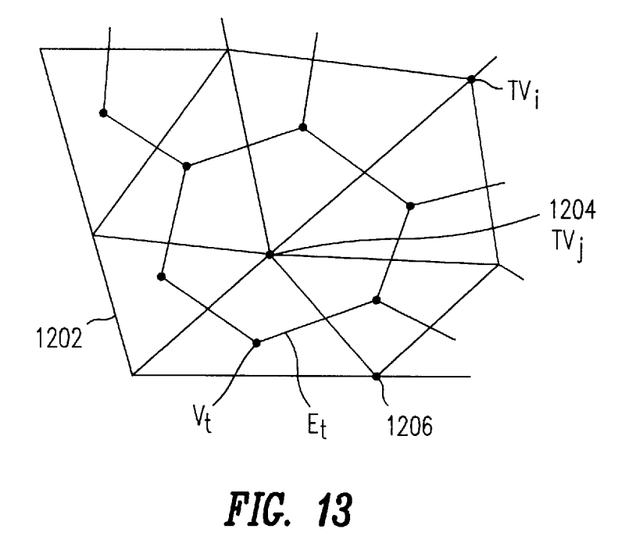
FIG. 13 is a partially enlarged diagram of an adjoining graph.

Referring also to FIGS. 12 and 13, the adjoining graph $G_t(V_t, E_t)$, corresponding to FIG. 11, is shown. In the adjoining graph $G_t(V_t, E_t)$, the vertices $V_t$ comprise the center points of the triangles, and the adjoining edges $E_t$ comprise the lines connecting the center points of adjacent triangles. Adjoining graph $G_t(V_t, E_t)$, is a simple planar, connected graph, with one to three edges connected at each vertex. FIG. 13 is a partially enlarged diagram of FIG. 12.

Calculation of Distances from Triangles to Boundaries

Referring to FIG. 10, in step 1004, the topological distance of each triangle to the boundary 1202 is ascertained. Referring now also to FIGS. 12 and 13, the topological distance of each triangle to the boundary 1202 is defined as the sum of the topological distances of each triangle vertex to the boundary 1202.

The topological distance from a triangle vertex 1204, 1206 to the boundary 1202 is the count of the least number of triangle edges that connect the triangle vertex to the domain boundary 1202. The topological distance of a triangle vertex 1204 located on a domain boundary 1202 is 0.

The topological distance for the triangle vertices is determined beginning with vertices having topological distance 0 in ascending order. If the topological distance of a triangle vertex $TV_n$ has not been defined and the triangle vertex $TV_n$ connects to a triangle vertex $TV_i$ having a topological distance I, a topological distance of I+1 is assigned to triangle vertex $TV_n$. The method repeats until the topological distance are defined for all vertices.

Division of a Region into Layers

Figure 14:
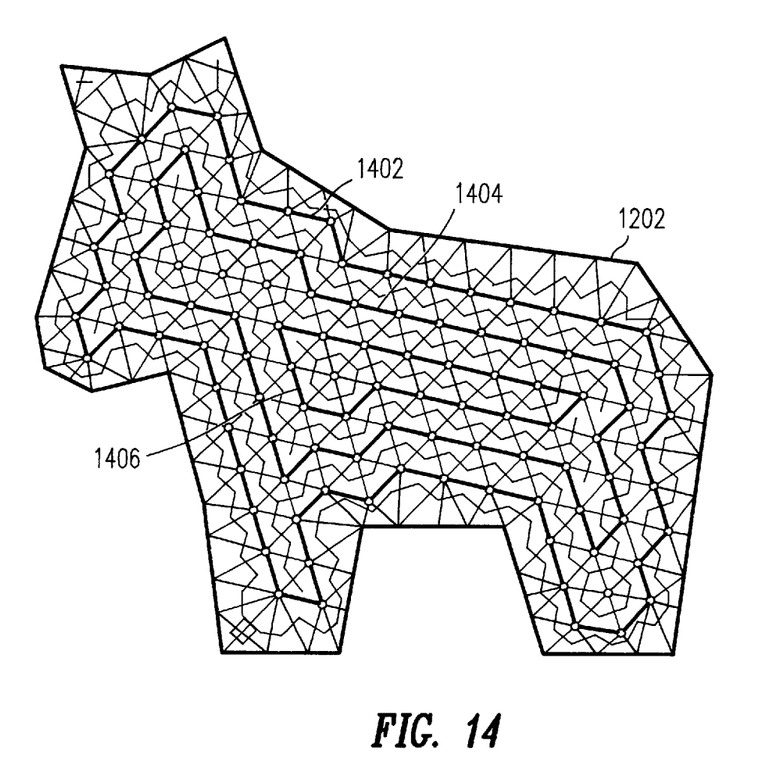
FIG. 14 is a diagram showing an adjoining graph after dividing the triangular mesh into layers.

Referring to FIG. 10 at step 1006 and FIG. 14, the region S is divided into belt-shaped small domains or layers $S_i$ 1402, 1404, 1406 according to the topological distances of the triangles to the boundary. Hereinafter, belt-shaped domains and belt-shaped small domains will be referred to as layers. The diagram shown in FIG. 14 corresponds to the diagram shown in FIG. 12 after dividing the region into layers. In FIG. 14, the layer boundaries 1402, 1404, 1406 are shown by heavy solid lines. Each layer $S_i$ 1402, 1404, 1406 comprises triangles having topological distances 3i, 3i+1, and 3i+2. The layers tend to follow the shape of the boundary 1202. The layer adjacent the boundary is called $S_0$. The layers $S_i$ are positioned inside the region S in the order $S_0, S_1, S_2, S_3 \ldots$. For example, in FIG. 14, layer $S_0$ 1402 comprises triangles having topological distances 0, 1, and 2. Also in FIG. 14, layer $S_1$ 1404 comprises triangles having topological distances 3, 4, and 5.

After dividing the region into layers, the edges $E_t$ in the adjoining graph which cross layer boundaries 1402, 1404, 1406 are removed from graph $G_t(V_t, E_t)$. The edges $E_t$ in the adjoining graph within in the same layer remain in graph $G_t(V_t, E_t)$. The resulting graph is called graph $G_s(V_t, E_s)$. In graph $G_s$, the set of vertices are $V_t$ from graph $G_t$. Because the edges in the adjoining graph are used for subsequent matching, removing edges reduces the amount of matching to be performed and therefore reduces computation time. In FIG. 14, the edges of the adjoining graph which cross a layer boundary are removed.

Removal of Invalid Edges

Figure 15:
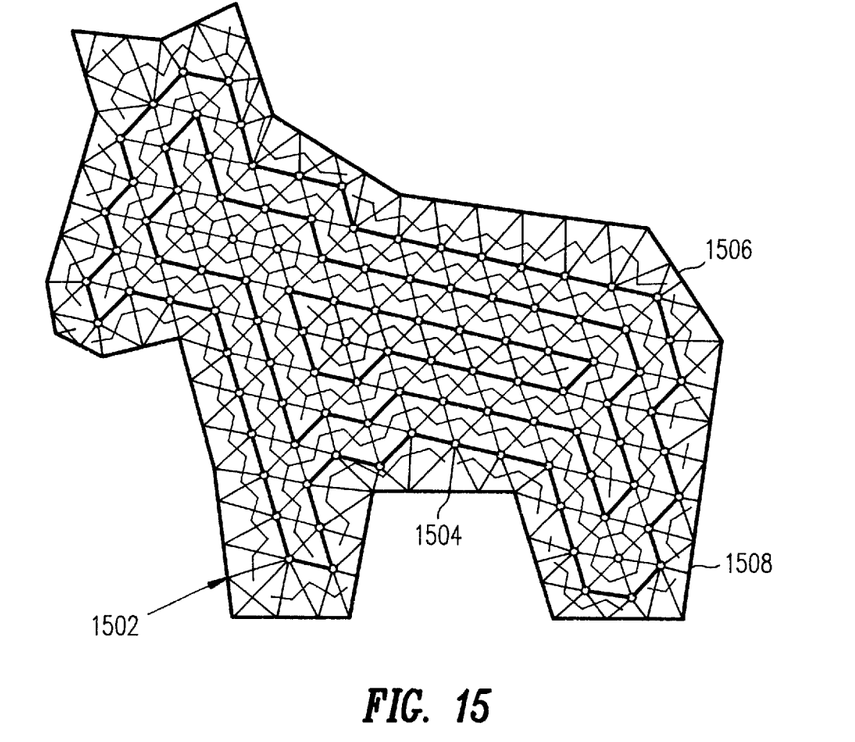
FIG. 15 is a diagram showing an adjoining graph for each layer with invalid edges removed.

Referring to FIG. 10, in step 1008 more edges are removed. Referring to FIG. 15, a figure depicting removed target edges in designated areas 1502, 1504, and 1506 is shown. The adjoining graph $G_s$ is used to find edges to remove. Two adjacent triangles containing the points at the end of an edge $E_s$ are matched to form a quadrilateral. If the quadrilateral is not convex, the edge $E_s$ is invalid and is removed from adjoining graph $G_s(V_t, E_s)$. In the preferred embodiment of the present invention, even though the resulting quadrilateral is convex, an edge is $E_s$ invalid if an interior angle of the resulting quadrilateral exceeds a threshold. The threshold is less than 180°, such as 160° for example. When an interior angle exceeds the threshold, the edge is invalid and is removed. In addition, the threshold varies according to the application. The resulting graph with removed edges is called $G_c(V_t, E_c)$.

Generating the Queue for Triangles for Matching

Referring to FIG. 10, in step 1010 a queue Q is generated for matching. Using graph $G_c(V_t, E_c)$, a point $V_t$ having one connected edge $E_c$ is added to the queue Q. Points having no connected edges, as in isolated triangles, are marked to indicate that the process was performed.

Matching

Referring to FIG. 10 step 1012, a matching process is performed. Matching converts graph $G_c(V_t, E_c)$ into graph $G_m(V_t, E_m)$. Graph $G_m(V_t, E_m)$ comprises three types of sub-graphs or groups:

Sub-graph 1 has two points connected by one edge (as shown in FIG. 4);

Sub-graph 2 has one isolated point (as shown in FIG. 5); and

Sub-graph 3 has four points, connected by three edges to form a star shape (as shown in FIG. 6).

Sub-graphs 1, 2 and 3 correspond to conversion methods 1, 2, and 3, respectively. If the queue Q is not empty, one point $V_i$ is extracted from the head of the queue Q. If point $V_j$, which is adjacent point $V_i$, is present, one of the following cases is selected according to the connected state of points $V_i$ and $V_j$. If point $V_i$ has a process end mark or matching complete mark, point $V_i$ is removed from the queue Q. Hereinafter, process end mark will be referred to as a matching complete mark. Cases 1, 2, 3, 4, and 5, described below, are selected if the queue Q is not empty. When the queue Q is empty, cases 6 or 7 are executed. The above described process repeats until case 7 occurs, which indicates the matching is complete.

Figure 16:
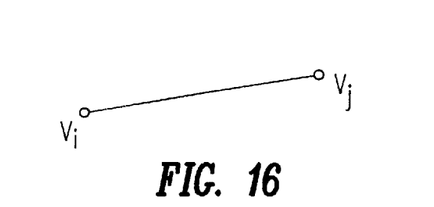
FIG. 16 is a diagram showing a point $V_j$ that has no adjacent points except for point $V_i$.

Case 1: Referring to FIG. 16, a point $V_j$, having no adjacent points except for node $V_i$ is shown. Point $V_i$ is removed from the queue Q and a matching complete mark is provided for both points $V_i$ and $V_j$.

Figure 17:
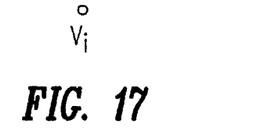
FIG. 17 is a diagram showing point $V_i$ as an isolated point.

Case 2: Referring to FIG. 17, an isolated point $V_i$ is shown. Point $V_i$ is removed from the queue Q and a matching complete mark is provided for point $V_i$.

Figure 18:
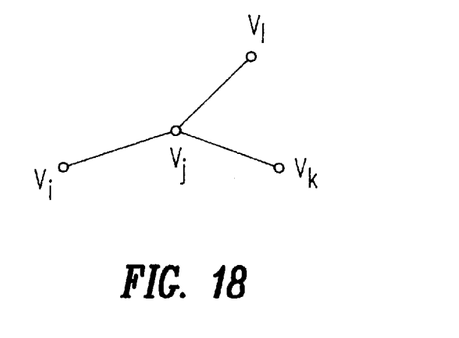
FIG. 18 is a diagram illustrating a case where point $V_j$ has two adjacent points $V_k$ and $V_l$ in addition $V_i$ and where $V_k$ and $V_l$ each have no adjacent point except for $V_j$.

Case 3: Referring to FIG. 18, a point $V_j$ having two adjacent points $V_k$ and $V_l$ in addition to point $V_i$, such that points $V_k$ and $V_l$ have no adjacent points except for $V_j$, is shown. A matching complete mark is provided for all the points $V_i$, $V_j$, $V_k$ and $V_l$.

Figure 19:
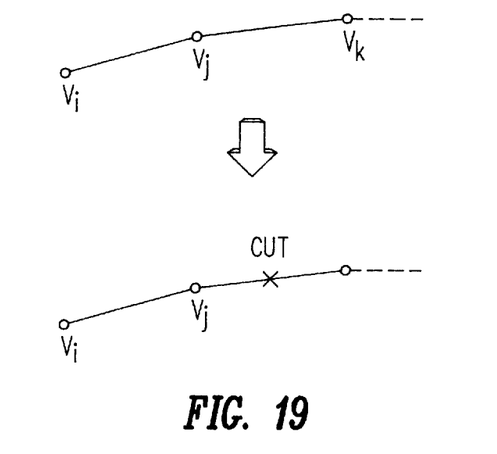
FIG. 19 is a diagram illustrating a case where point $V_j$; has an adjacent point $V_k$ in addition to $V_i$.

Case 4: Referring to FIG. 19, a point $V_j$ having one adjacent point, $V_k$, in addition to point $V_i$ is shown. Point $V_i$ is removed from the queue Q, and a matching complete mark is provided for points $V_i$ and $V_j$. The edge that connects point $V_j$ to point $V_k$ is removed. When the edge is removed, a matching complete mark is provided for point $V_k$, if $V_k$ is an isolated point. If point $V_k$ has one adjacent point, it is added to the end of the queue Q.

Figure 20:
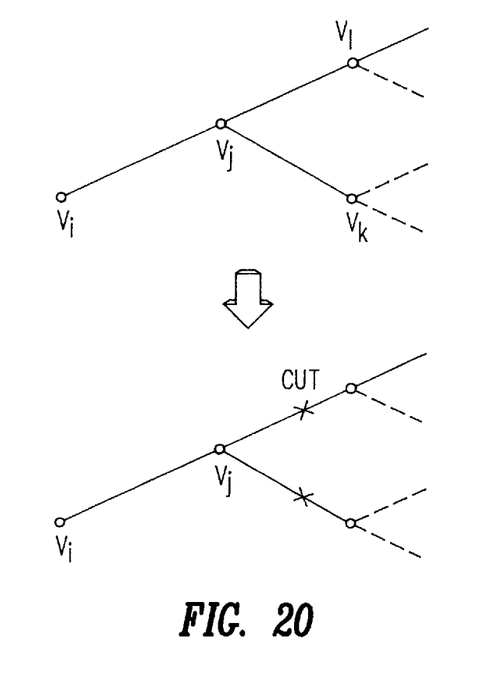
FIG. 20 is a diagram illustrating a case where point $V_j$, has two adjacent points $V_k$ and $V_l$ in addition to $V_i$, and either point $V_k$ or point $V_l$ has an adjacent point in addition to $V_j$.

Case 5: Referring to FIG. 20, a point $V_j$ having two adjacent points $V_k$ and $V_l$ in addition to point $V_i$, whereby at least one of the points $V_k$ and $V_l$ has an adjacent point, is shown. Point $V_i$ is removed from the queue Q and a matching complete mark is provided for points $V_i$ and $V_j$, The two edges that connect point $V_j$ to points $V_k$ and $V_l$ are removed. After the edges are removed, if points $V_k$ and $V_l$ are isolated, a matching complete mark is provided for points $V_k$ and $V_l$. If points $V_k$ and $V_l$ have an adjacent point, points $V_k$ and $V_l$ are added to the end of the queue Q.

Figure 21:
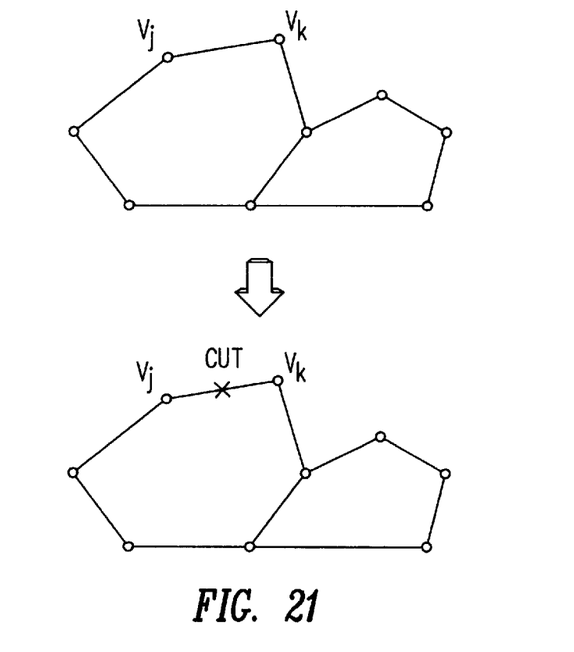
FIG. 21 is a diagram showing a case where queue Q is empty and points that are not yet processed remain.

Case 6: Referring to FIG. 21, the queue Q is empty and points $V_j$ and $V_k$ have not been processed. The edge connecting points $V_j$ and $V_k$ is selected and removed. Points $V_j$ and $V_k$ are added to the end of the queue Q.

Case 7: When the queue Q is empty and all the points are processed and matched, step 1012 (shown in FIG. 10) is complete. Graph $G_c(V_t, E_c)$ has been converted into graph $G_m(V_t, E_m)$, comprising groups of triangles representing sub-graphs 1, 2, and 3. The graph $G_m(V_t, E_m)$ is ready to be converted to quadrilaterals.

Conversion to Quadrilaterals

Referring to FIG. 10 step 1014, graph $G_m(V_t, E_m)$ is converted to quadrilaterals. The sub-graphs or triangle groups are individually extracted from graph $G_m$, and the regions represented by the extracted sub-graphs are converted into quadrilaterals in the following manner.

Referring to FIG. 16, triangles corresponding to two points connected by an edge $E_m$ are combined to form a quadrilateral. Using the method shown in FIG. 4, the quadrilateral is then divided into four quadrilateral elements using midpoints on the quadrilateral sides and one additional point inside the quadrilateral. The vertices of each quadrilateral element comprise a vertex of the original quadrilateral, two vertices comprising midpoints of two adjacent quadrilateral sides, and a vertex consisting of the additional point inside the quadrilateral.

Referring to FIGS. 5 and 17, a triangle corresponding to an isolated point is divided into three quadrilateral elements using midpoints on the triangle sides, and one additional point inside the triangle. The vertices of each quadrilateral element comprise a vertex of the original triangle, two vertices comprising midpoints of two adjacent triangle sides, and a vertex consisting of the additional point inside the triangle.

Referring to FIGS. 6 and 18, four triangles corresponding to four points connected by three edges in star shape are combined. The area formed by combining the four triangles is divided into twelve quadrilateral elements using the midpoints of the six outer sides, and seven additional internal points. The vertices of the quadrilateral elements formed on the outer sides comprise a vertex of an original triangle, two vertices comprising midpoints of two adjacent triangle outer sides, and a vertex consisting of an additional point inside the star shape.

Figure 22:
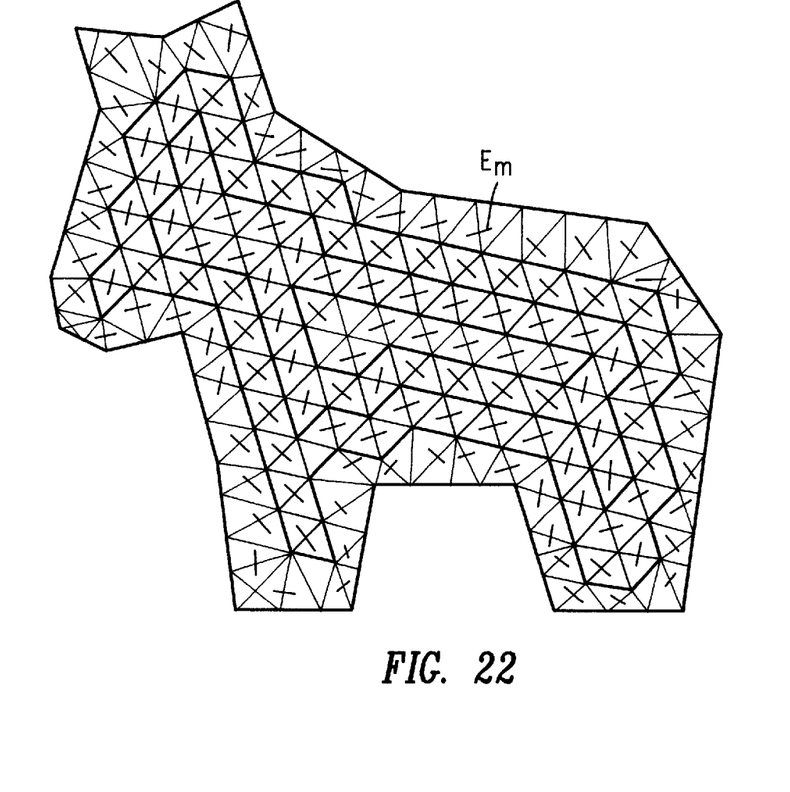
FIG. 22 is a diagram showing a graph after matching is completed.

Referring to FIG. 22, a diagram showing a graph after matching is performed is shown. The diagram in FIG. 22 corresponds to the diagram of FIG. 15 after the matching process. In FIG. 22, edges $E_m$ corresponding to matched triangle pairs remain.

Figure 23:
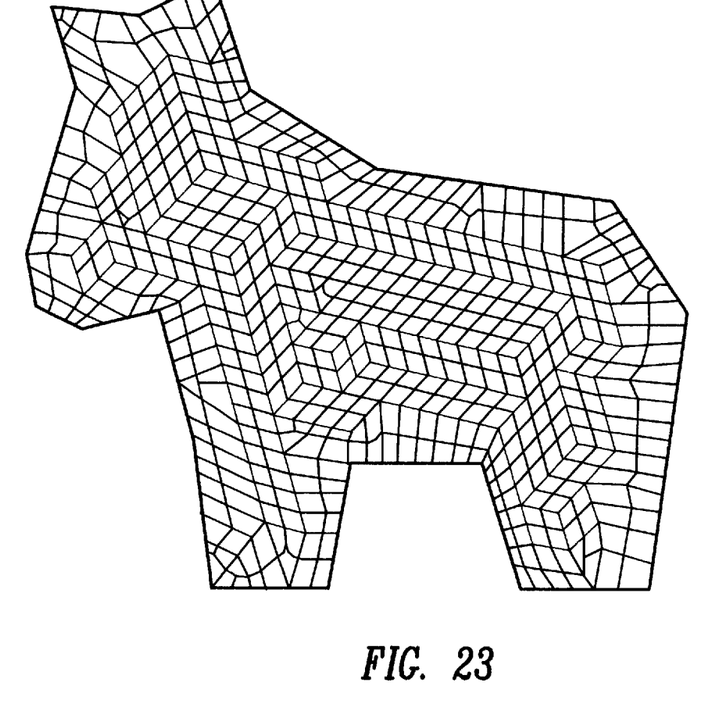
FIG. 23 is a diagram showing the resultant quadrilateral mesh.

Referring to FIG. 23, a quadrilateral displaying the result of the method of the present invention is shown. The diagram in FIG. 23 corresponds to the diagram of FIG. 12 after converting the isolated and matched triangles into quadrilaterals.

Figure 24:
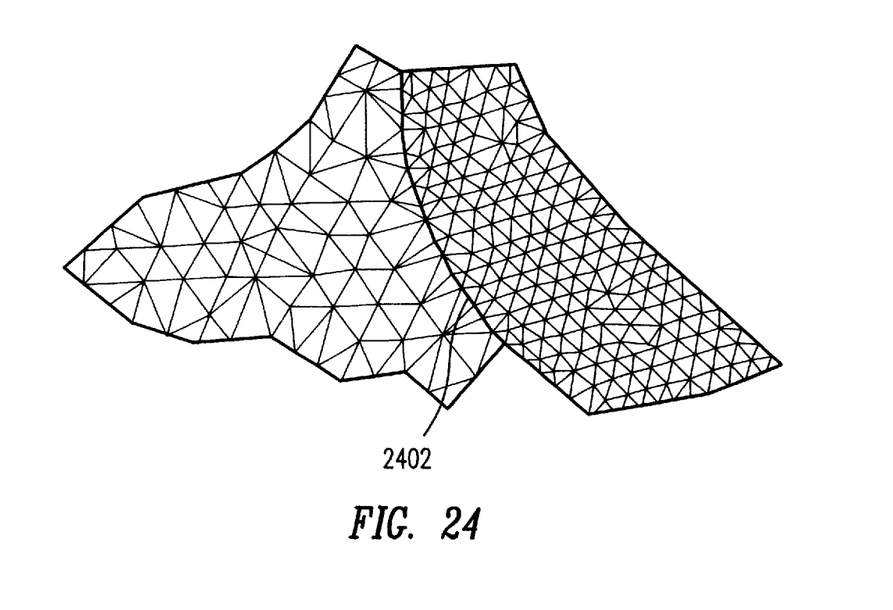
FIG. 24 is a diagram showing triangular meshes having internal boundaries.
Figure 25:
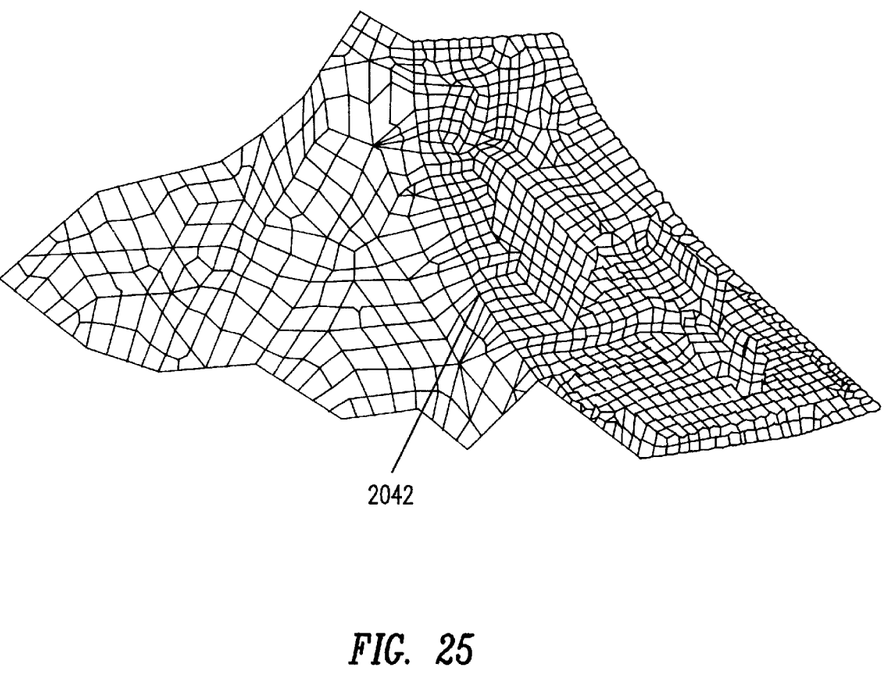
FIG. 25 is a diagram showing quadrilateral meshes having internal boundaries.

Referring to FIG. 24, a diagram applying the present invention to triangular meshes in a region having an internal boundary 2402 is shown. When a boundary requirement for an internal region is defined, by the finite-element method for example, at step 1004 (shown in FIG. 10) the distance of a triangle vertex located on an internal boundary is also defined as 0. For example, referring also to FIG. 14, in a computer graphics application, the boundaries 1402, 1404, 1406 between the layers s represent contour lines on a map, and internal boundaries correspond to valleys. Referring also to FIG. 25, a quadrilateral mesh generated by the method of the present invention from the triangular mesh of FIG. 24 is shown. In FIG. 25, the internal boundary 2402 is preserved.

In an alternative embodiment of the present invention, the matching process generates sub-graphs 1 and 2.

Procedure Organization

In the preferred embodiment of the present invention, the processing is organized into the following three procedures.

Procedure 1: For all triangles, the topological distance of a triangle from the boundary for all triangles is ascertained.

Procedure 2: With triangles of the mesh containing points $V_t$ in a graph, a connected planar graph $G_t(V_t, E_t)$, in which the adjacent relationship of triangles is edge $E_t$, is prepared. The triangles are grouped based on their topological distance from the boundary. The entire region is divided into layers for each topological distance of the triangles from the boundary. Accordingly, the graph $G_t(V_t, E_t)$ is converted into a non-connected graph $G_s(V_t, E_s)$.

Procedure 3: By pairing or matching two adjacent nodes in graph $G_s(V_t, E_s)$, quadrilateral meshes are generated most often using conversion method 1. When conversion method 1 cannot be used, either conversion method 2 or 3 is used. Although it is preferable to use conversion methods 1, 2, and 3, quadrilateral meshes with a satisfactory property are provided even when only conversion methods 1 and 2 are used.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A method for converting triangular meshes to quadrilateral meshes in a computer system, the computer system comprising a processor, a means for inputting graphical data, the graphical data comprising at least one surface, the surface being defined by at least one boundary, the surface comprising at least one triangular mesh, the triangular mesh comprising at least one triangle, said triangle having edges and vertices, the method comprising the processor-executed steps of:

(a) for at least one triangle, ascertaining the topological distance from the triangle to the boundary;

(b) dividing the surface into at least one layer, the layer comprising at least one triangle, such that each layer comprises triangles having a topological distance within a predetermined range from the boundary;

(c) for at least one layer, forming at least one group, the group comprising at least one triangle; and (d) dividing each group into at least three quadrilateral elements.

2. The method as in claim 1, wherein said step (c) forms at least one group comprising a pair of matched adjacent triangles.

3. The method as in claim 2, wherein said step (d) divides the group into at least four quadrilateral elements.

4. The method as in claim 1, wherein said step (c) forms at least one group comprising four matched triangles, such that one triangle is adjacent the other three triangles.

5. The method as in claim 4, wherein said step (d) divides the group into at least twelve quadrilateral elements.

6. The method as in claim 1 wherein the topological distance is the sum of the distances of each triangle vertex to the boundary, wherein the distance from each triangle vertex to a boundary is the minimum number of edges connecting the vertex to the boundary.

7. The method as in claim 1 wherein the quadrilateral elements are convex.

8. The method as in claim 7 wherein interior angles of the quadrilateral elements are less than or equal to a threshold.

9. A method for converting triangular meshes to quadrilateral meshes in a computer system, the computer system comprising a processor, a means for inputting graphical data comprising at least one surface and at least one boundary, the surface comprising at least one triangular mesh, the triangular mesh comprising at least one triangle, the triangle having vertices and edges, the method comprising the processor-executed steps of:

(a) preparing an adjoining graph for connecting adjacent triangles of the triangular mesh, the adjoining graph comprising points and adjoining edges, such that each triangle has one point, the point being inside the triangle, and adjoining edges connect points of adjacent triangles;

(b) ascertaining the topological distance between at least one triangle and the boundary;

(c) dividing the surface into at least one layer, the layer comprising at least one triangle, such that each layer comprises triangles having a topological distance within a predetermined range from the boundary;

(d) traversing the points of the adjoining graph and removing the adjoining edge if the adjoining edge connects triangles in different layers;

(e) traversing the points of the adjoining graph and removing the adjoining edge when combining the two triangles corresponding to the adjoining edge forms a concave quadrilateral; and (g) traversing the points of the adjoining graph and matching adjacent triangles to form triangle pairs;

(h) forming quadrilaterals from matched triangle pairs and dividing the quadrilaterals into four quadrilateral elements; and (i) for triangles having no matched triangle, dividing the triangle into three quadrilateral elements.

10. A computer system for converting triangular meshes to quadrilateral meshes comprising:

means for inputting graphical data, the graphical data comprising at least one surface and boundaries, the surface comprising at least one triangular mesh, the triangular mesh comprising at least one triangle;

means for, for at least one triangle, ascertaining a topological distance from the triangle to the boundary;

means for dividing the surface into at least one layer, the layer comprising at least one triangle, such that each layer comprises triangles having a topological distance within a predetermined range from the boundary;

means for, for at least one layer, forming at least one group, the group comprising at least one triangle; and means for dividing each group into at least three quadrilateral elements.

11. A computer system as in claim 10, wherein at least one group comprises a pair of adjacent triangles.

12. A computer system as in claim 11, wherein the group forms a quadrilateral and the quadrilateral is divided into at least four quadrilateral elements.

13. A computer system as in claim 10, wherein least one group comprises four triangles, such that one triangle is adjacent the other three triangles.

14. A computer system as in claim 13, wherein the group is divided into at least twelve quadrilateral elements.

15. A computer system as in claim 14 wherein the topological distance is the sum of the distances of each triangle vertex to the boundary, and the distance from each triangle vertex to a boundary is the minimum number of edges connecting the vertex to the boundary.

16. A computer system as in claim 10 wherein the quadrilateral elements are convex.

17. A computer system as in claim 16 wherein interior angles of the quadrilateral elements are less than or equal to a threshold.

18. A computer program product for a computer system, said computer program product comprising:

a computer usable medium having computer readable program code means embodied in said medium causing a triangular mesh to be converted to a quadrilateral mesh, said computer program product including:

computer readable first program code means for inputting graphical data, the graphical data comprising at least one surface and boundary, the surface comprising at least one triangular mesh, the triangular mesh comprising at least one triangle;

computer readable second program code means for, for at least one triangle, ascertaining the topological distance from the triangle to the boundary;

computer readable third program means for dividing the surface into at least one layer, the layer comprising at least one triangle, such that each layer comprises triangles having a topological distance within a predetermined range from the boundary;

computer readable fourth program means for, for at least one layer, forming at least one group, the group comprising at least one triangle; and computer readable fifth program means for dividing each group into at least three quadrilateral elements.

* * * * *